No. 767,844. Patented August 16, 1904.

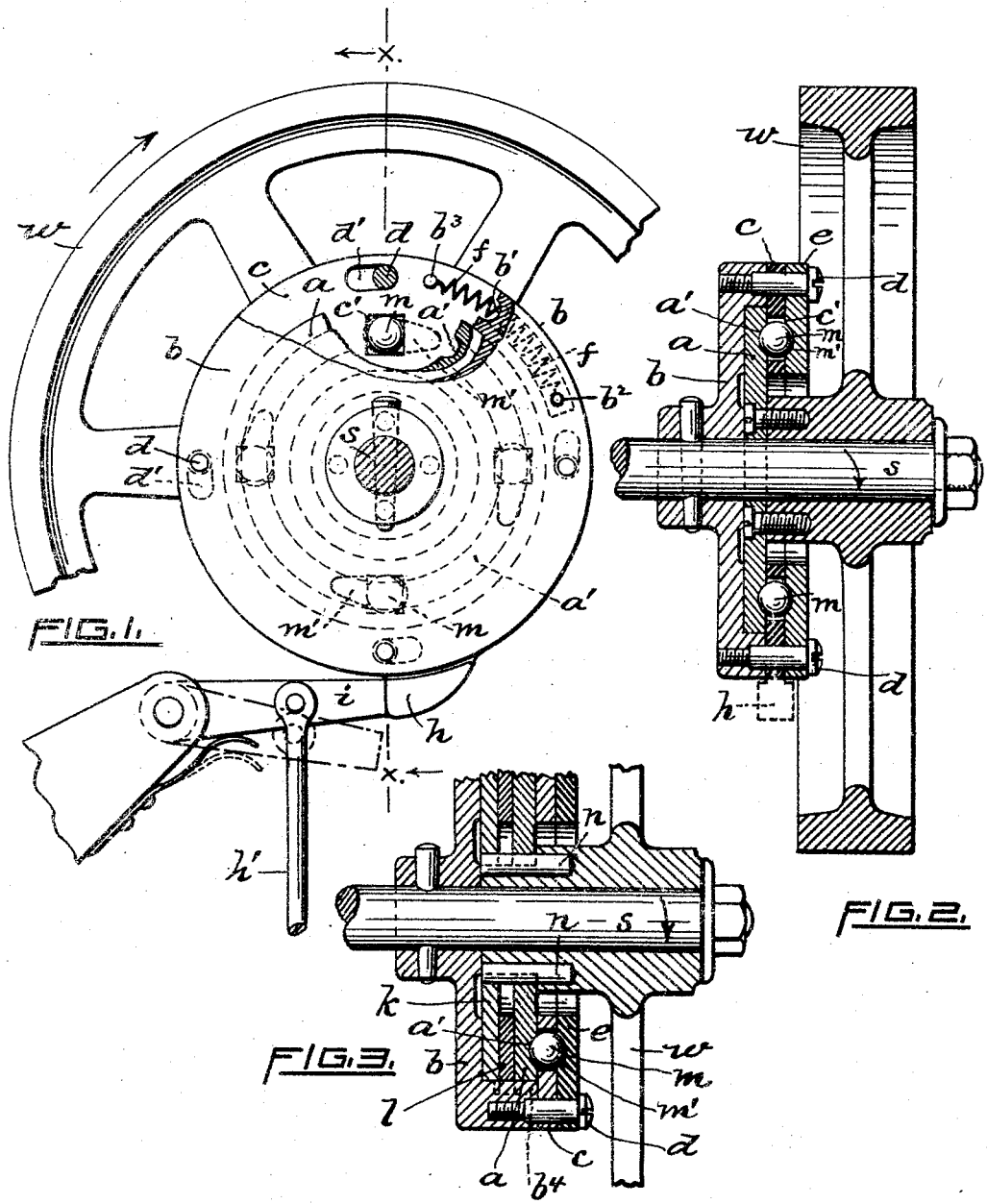

UNITED STATES PATENT OFFICE.

WILLARD A. SMITH, OF PORTSMOUTH, NEW HAMPSHIRE, ASSIGNOR TO SMITH LACING MACHINE COMPANY, OF EXETER, NEW HAMPSHIRE, A CORPORATION OF MAINE.

FRICTION-CLUTCH.

SPECIFICATION forming part of Letters Patent No. 767,844, dated August 16, 1904.

Application filed January 13, 1904. Serial No. 188,903. (No model.)

*To all whom it may concern:*

Be it known that I, WILLARD A. SMITH, a citizen of the United States of America, and a resident of Portsmouth, in the county of Rockingham and State of New Hampshire, have invented certain new and useful Improvements in Friction-Clutches, of which the following is a specification.

My invention relates to friction-clutches; and it consists, essentially, in the combination of a driving-disk member capable of being continuously rotated, an independently-movable cage or disk provided with a plurality of antifriction-balls adapted to bear against the adjacent face of said driving-disk, a casing having said cage secured thereto, the disk being located between them and in frictional engagement with the casing, a cap rigidly secured to the latter provided with inclined or wedge-shaped tracks or seats for said balls, and means for arresting the movement of the cage, whereby the balls are forcibly released from action, all as hereinafter set forth and claimed.

By means of my improved friction-clutch a greater degree of efficiency may be attained, this result being due to the simultaneous wedging action of the antifriction-balls and the consequent frictional engagement of the adjacent surfaces of the disks, or, in other words, a given power or force imparted to the balls materially increases the holding capacity of the clutch. It is comparatively inexpensive to manufacture, it is wholly self-contained, it can be fitted up complete independently of the fly-wheel or other driving member and is capable of being readily secured thereto, and in case of repairs, &c., it can be easily disconnected therefrom.

In the accompanying sheet of drawings, Figure 1 is a front end elevation of my improved friction-clutch in the normal or stationary position, portions being broken away. Fig. 2 is a transverse sectional view taken on line $x\ x$ of Fig. 1, and Fig. 3 is a similar sectional view showing a modification.

Again referring to the drawings, $w$ designates a fly-wheel or pulley or other suitable driving member loosely mounted on a revoluble shaft $s$. Said wheel may be operated by a continuously-traveling driving-belt, if desired.

The clutch mechanism proper is constructed and arranged substantially as follows: A disk or friction member $a$ of suitable diameter is rigidly secured, say, to the front end of the hub of said wheel $w$. The inner or rear face of the disk is provided with a shallow concentric groove $a'$, the same forming a circular track for the antifriction-balls soon to be described.

$b$ indicates the main driven member or casing, rigidly fastened to shaft $s$. The back of the casing is recessed to receive said disk $a$, the latter being adapted to revolve freely therein when the clutch is out of action. A thin flat ring or cage $c$ is located contiguous to the rear face of the disk $a$. It is capable of a short independent angular movement and is supported by (as drawn) four peripherally-arranged bolts $d$, passing transversely through elongated openings $d'$, formed therein beyond the disk $a$ and extending into the casing $b$. The cage is provided with, say, four antifriction-balls $m$, mounted to revolve in openings $c'$, formed in the cage therefor. The balls are considerably thicker than the cage and are adapted to move freely in the circular track $a'$ of the friction-disk $a$. To the rear of the cage is located an annular cover-plate $e$, the same being rigidly secured to the casing $b$ by the said bolts $d$, as clearly shown in the drawings. The face of the plate opposite each ball $m$ is provided with an inclined or wedge-shaped recess or groove $m'$, the depth of the groove at the rear end (considered with respect to the direction of rotation of the clutch) permitting a free movement of the ball when the clutch is out of action or normally inoperative, as shown in Fig. 1. The said grooves gradually decrease in depth in the direction of rotation of the device.

In order to insure a positive action of the clutch when the cage is released, (by means about to be described,) I may provide the casing member with a peripheral recess $b'$, in which is mounted a helical spring $f$, one end, $b^2$, being fast to the casing itself, the other or rear end, $b^3$, being secured to the cage.

The cage has an integral lug $h$ extending beyond the casing. This lug, combined with a swinging dog $i$, constitutes a stop-motion device—that is to say, the dog when interposed in the path of the revolving lug arrests the forward movement of the cage, thereby forcing the balls $m$ rearwardly along the grooves $m'$ to the normal stationary position, thereby stopping the rotation of the shaft.

The movements of the dog $i$ may be controlled by a treadle connection $h'$ or in any other suitable or well-known manner, according to the type of mechanism being operated upon by the driven shaft $s$.

The manner of operation of my improved friction-clutch is as follows: First assuming the driving-pulley $w$ to be revolving in the arrow direction upon the shaft $s$, Fig. 1, and the clutch mechanism being held normally stationary by means of the engagement of the spring-pressed dog $i$ with the lug $h$ of the ball-carrying cage $c$, now upon disengaging the dog from the lug (see dotted-line position) the force or reaction of the spring $f$ advances the cage a short angular distance between the adjacent faces of the two members $a$ and $e$, thereby carrying the balls forward along the inclined grooves $m'$ until they (the balls) become, as it were, wedged laterally against the bottom of the said grooves and the track $a'$ of the revolving driving-disk $a$, at which instant the rotary movements of the latter force the balls still farther ahead until they become tightly wedged in position, thereby pressing the disk $a$ laterally into snug frictional engagement with the adjacent face of the casing $b$, resisted by the cap or plate $e$, and causing the clutch and shaft to then revolve in unison with the driving-pulley. The greater the force upon the balls in wedging the disks together the greater the holding capacity of the clutch. By means of this construction I am enabled to attain not only the action due to the direct frictional contact of the balls upon the disks, but the greater and additional action or effect resulting therefrom by the frictional engagement of the disks themselves.

The clutch mechanism is thrown out of action by simply interposing the dog $i$ in the path of the cage-lug $h$. When these two members engage each other, the rotation of the cage is instantly stopped, the momentum carrying the parts $b$ and $e$ ahead of the cage a short angular distance, limited by the slots $d'$, and correspondingly elongating the spring $f$, the result being to free the balls from the bottom of the several grooves, the relative position of the parts then being substantially as represented in Fig. 1.

In the modification illustrated in Fig. 3 are shown two additional friction-disks $k$ and $l$. These are interposed between the disk $a$ and casing $b$. The driving-disks $a$ and $k$ are secured to pins or keys $n$, driven into the face of the pulley-hub, thus causing said disks to revolve with the pulley whenever it is in motion. The disk $l$ is located between the adjacent faces of the driving members $a$ and $k$ and is secured to the casing $b$ by peripheral keys $b^4$ or in any other suitable manner. This arrangement and manner of operation is substantially the same as described with respect to Figs. 1 and 2, although its holding capacity or area of frictional contact-surface is materially increased.

I am aware that prior to my invention clutches have been devised in which balls and disks or plates were employed to effect a frictional contact of the clutch members. Therefore I do not claim such former construction.

I claim as my invention and desire to secure by United States Letters Patent—

1. In a friction-clutch, the combination of a driving-disk member capable of continuous rotation, a revoluble disk or member adapted to be driven by the frictional engagement therewith of said driving-disk, a cap-plate rigidly secured to said driven disk, an independent plate or frame $c$, a plurality of antifriction-balls loosely mounted in and extending transversely through said frame interposed between and capable of frictional engagement with the adjacent surfaces of said driving-disk and cap-plate, the latter having wedge-shaped seats for the balls, and means coacting with said frame $c$ for controlling the movements of the latter, whereby the balls are forced into or out of action, substantially as described and for the purpose set forth.

2. In a friction-clutch, the combination with a revoluble driven disk or member $b$ and a cap-plate $e$ secured thereto provided on its inner face with wedge-shaped recesses, of a revoluble driving-disk $a$ adapted when in use to frictionally bear against the inner face of said member $b$, a plurality of suitably-mounted antifriction-balls interposed between and in frictional engagement with said members $a$ and $e$, and means for controlling the angular movements of the balls with respect to said recesses.

3. In a friction-clutch, the combination with the driven disk $b$, cap-plate $e$ having recesses therein, and the spring-pressed frame $c$, the latter interposed between and capable of independent angular movement with respect to said members $b$ and $c$, of a driving disk or member $a$, a plurality of antifriction-balls $m$ mounted in said frame and in engagement with the adjacent faces of said members $a$ and $e$, and means for forcing said balls into and out of action, substantially as hereinbefore described and for the purpose set forth.

Signed at Portsmouth, New Hampshire, this 11th day of January, 1904.

WILLARD A. SMITH.

Witnesses:
J. P. HOLMEN,
JOHN PENDER.